United States Patent [19]

Hayakawa et al.

[11] Patent Number: 5,421,877
[45] Date of Patent: Jun. 6, 1995

[54] CERAMIC COLOR COMPOSITION AND METHOD OF FORMING CERAMIC COLOR FILM ON GLASS PLATE USING SAME

[75] Inventors: Masanori Hayakawa; Keiji Ohnishi, both of Matsusaka, Japan

[73] Assignee: Central Glass Company, Limited, Ube, Japan

[21] Appl. No.: 168,326

[22] Filed: Dec. 17, 1993

[30] Foreign Application Priority Data

Dec. 21, 1992 [JP] Japan .................................. 4-340635

[51] Int. Cl.$^6$ ................................................. C09C 1/34
[52] U.S. Cl. .................. 106/453; 427/376.2; 427/389.7; 427/397.7; 501/17; 501/18; 501/20; 501/23
[58] Field of Search ............... 427/376.2, 389.7, 397.7; 501/17, 20, 18, 23; 106/453

[56] References Cited

U.S. PATENT DOCUMENTS

| | | | |
|---|---|---|---|
| 4,339,257 | 7/1982 | Ueda | 65/60.5 |
| 4,420,501 | 12/1983 | Ueda et al. | 427/54.1 |
| 4,618,538 | 10/1986 | Emonts et al. | 428/428 |
| 4,822,396 | 4/1989 | Reinherz et al. | 65/60.7 |
| 4,929,493 | 5/1990 | Tünker | 428/207 |
| 5,244,484 | 9/1993 | Chiba et al. | 65/24 |
| 5,296,413 | 3/1994 | Carroll et al. | 501/19 |

FOREIGN PATENT DOCUMENTS 56-62824 5/1980 Japan .
3-5337 1/1991 Japan .
3-285844 12/1991 Japan .

*Primary Examiner*—Mark L. Bell
*Assistant Examiner*—Scott L. Hertzog
*Attorney, Agent, or Firm*—Keck, Mahin & Cate

[57] ABSTRACT

A ceramic color composition for coating a glass plate with the same includes first and second inorganic pigments, an optional filler, a low melting point glass frit, a resin and an oil. The total of the first and second inorganic pigments and an optional filler amounts to "A" parts by weight. The low melting point glass frit amounts to "B" parts by weight. The first and second inorganic pigments have average particle sizes ranging from 0.1 to 1.5 μm and from 2 to 50 μm, respectively. A ratio of "A" to the total of "A" and "B" ranges from 0.08 to 0.40. A ratio of the amount by weight of the first inorganic pigment to the total of "A" and "B" ranges from 0.05 to 0.25. A ratio of the amount by weight of the second inorganic pigment to the total of "A" and "B" ranges from 0.03 to 0.15. The ceramic color composition is substantially improved in releasability of the same from a bending press mold.

6 Claims, No Drawings

CERAMIC COLOR COMPOSITION AND METHOD OF FORMING CERAMIC COLOR FILM ON GLASS PLATE USING SAME

BACKGROUND OF THE INVENTION

The present invention relates to a ceramic color composition and a method of forming a ceramic color film on a glass plate using the ceramic color composition.

Hitherto, various ceramic color compositions in the form of paste have been proposed to be applied to, for example, a peripheral portion of an automobile window glass pane by the screen-printing. The ceramic color composition coated on the glass pane is dried and then baked so as to form thereon a ceramic color film. This film provides the glass pane with a colored and opaque portion and thus serves to prevent deterioration of an adhesive such as urethane sealant due to ultraviolet rays and to conceal, for example, a terminal of heating strips. A ceramic color composition in the form of paste comprises an amorphous or crystallizable glass powder, an inorganic pigment and an organic vehicle.

For example, JP-A-55-62824 discloses a ceramic color composition comprising A parts by weight of an inorganic pigment and B parts by weight of a low melting point glass powder, which are dispersed in a paste containing a resin and an oil, wherein the ratio of A/(A+B) ranges from 0.30 to 0.65.

Recently, there is an increasing demand to produce curved automobile window glass pane. Thus, hitherto, various press bending methods have been proposed to bend an automobile window glass pane. In a press bending method, the glass pane is pressed between male and female press molds provided with refractory glass cloths. However, in case that the glass pane coated with a ceramic color composition is pressed to bend the same, the ceramic color composition tends to stick to a press mold. This impairs a so-called releasability of the ceramic color composition from the mold and causes defect of a ceramic color film on the glass pane and uneven curvature of the glass pane. The ceramic color composition disclosed in JP-A-55-62824 is unsatisfactory with respect to the above-mentioned releasability, acid resistance, etc. To improve releasability, there is provided a method in which a releasing agent is applied to a surface of a ceramic color composition coated on the glass pane or to a surface of a press mold. However, this method increases the working step and the production cost.

JP-A-3-285844 discloses a ceramic color composition and a method of forming a ceramic color film on an automobile window glass pane using the ceramic color composition. The ceramic color composition comprises 5–30 wt % of a refractory inorganic pigment powder, 70–95 wt % of a crystallizable glass powder and 0–10 wt % of a refractory filler powder. The crystallizable glass powder comprises, by weight, 13–29% of $SiO_2$, 0.1–5% of the total of $Al_2O_3$ and $La_2O_3$, 50–75% of PbO, 4–20% of the total of $TiO_2$, $ZrO_2$ and $SnO_2$, 0–6% of $B_2O_3$, 0–5% of the total of $Li_2O$, $Na_2O$ and $K_2O$, 0–5% of the total of MgO, CaO, SrO and BaO, 0–5% of $P_2O_5$ and 0–2% of F. According to the method of JP-A-3-285844, the ceramic color composition is applied to a certain portion of an automobile window glass pane. Then, the coated glass pane is heated at a temperature ranging from 500° to 620° C. so as to fuse the ceramic color composition. Then, the coated glass pane is heated at a temperature ranging from 600° to 700° C. so as to crystallize the ceramic color composition. Then, the heated glass pane is bent by a press machine. However, it is difficult to obtain a desired color of a ceramic color film. For example, a gray color is unwillingly obtained instead of a black color due to the color of lead titanate or of lead silicate. Furthermore, the temperature at which the ceramic color composition is crystallized is limited. Therefore, the temperature range for the bending is narrowed.

JP-A-3-5337 discloses a method of bending a glass plate. In this method, a ceramic color ink kneaded with an inorganic substance (quarts gel or silica gel) having a particle size ranging from 5 to 60 $\mu$m and a softening point not lower than 650° C. is applied to a glass plate to form a printed layer. Then, the coated glass plate is heated at a temperature close to the softening point and a surface of a bending mold coated with a cloth of glass fiber is pressed against the coated glass plate to bend the glass plate.

SUMMARY OF THE INVENTION

It is therefore an object of the present invention to provide a ceramic color composition which is substantially improved in releasability from a bending press mold and in heat resistance, does not affect curvature of a curved glass plate, prevents breakage of the glass plate and deterioration of an adhesive due to ultraviolet rays, effectively conceals various parts and has a certain desired color.

It is another object of the present invention to provide an improved method of forming a ceramic color film on a glass plate using the ceramic color composition.

According to the present invention, there is provided a ceramic color composition for coating a glass plate with the same, comprising:

first and second inorganic pigments and an optional filler, the total of said first and second inorganic pigments and said optional filler amounting to "A" parts by weight, said first and second inorganic pigments having average particle sizes ranging from 0.1 to 1.5 $\mu$m and from 2 to 50 $\mu$m, respectively;

a low melting point glass frit amounting to "B" parts by weight;

a resin; and an oil;

wherein a ratio of "A" to the total of "A" and "B" ranges from 0.08 to 0.40, wherein a ratio of the amount by weight of said first inorganic pigment to the total of "A" and "B" ranges from 0.05 to 0.25, and wherein a ratio of the amount by weight of said second inorganic pigment to the total of "A" and "B" ranges from 0.03 to 0.15.

DESCRIPTION OF THE PREFERRED EMBODIMENTS

A ceramic color composition according to the present invention comprises first and second inorganic pigments, an optional filler, a low melting point glass frit, a resin and an oil.

The total of the first and second inorganic pigments and the optional filler amounts to "A" parts by weight. The low melting point glass frit amounts to "B" parts by weight.

According to the present invention, a glass plate is coated with the ceramic color composition by the screen-printing. Then, the ceramic Color composition on the glass plate is dried. Then, the coated glass plate is baked at a temperature, for example, from about 650° to 710° C. so as to form a ceramic color film on the glass plate. At the same time when it is baked, it is bent by a press mold.

Examples of the first and second inorganic pigments are Fe-Mn spinel, a mixture of CuO and $Cr_2O_3$, CuO and $Fe_3O_4$ for a black color, $Fe_2O_3$ for a brown color, CoO for a blue color, $Cr_2O_3$ for a green color, $TiO_2$, barium sulfate, silicon carbide and boron nitride for a white color, and a mixture of these compounds. A black color inorganic pigment is mixed with a white color inorganic pigment for providing a gray color inorganic pigment. It is preferable that the second inorganic pigment is selected from the group consisting of CuO, $Cr_2O_3$, barium sulfate and a mixture of these.

Examples of the refractory fillers are $Al_2O_3$, $ZrO_2$, a mixture of $ZrO_2$ and $SiO_2$ and $SiO_2$. These fillers can adjust fusing condition and expansion coefficient of the ceramic color film. The filler is optionally added to the first and second inorganic pigments and the glass frit in an amount of 0 to about 15 wt % of the total of "A" and "B". When $Al_2O_3$ is used as a filler, its average particle size is about 3 $\mu$m and the range of its particle size is from about 0.5 to 5 $\mu$m.

A ratio of A/(A+B) ranges from 0.08 to 0.40. If it is less than 0.08, the total amount of the first and second pigments becomes insufficient. Therefore, it is difficult to obtain a certain desired color of the pigment. If it is more than 0.40, the ceramic color film formed on a glass plate becomes porous. Therefore, water or a sealant tends to penetrate into the film and acid resistance of the film becomes inferior.

The first inorganic pigment has an average particle size ranging from 0.1 to 1.5 $\mu$m. If it is smaller than 0.1 $\mu$m, the price of the first inorganic pigment tends to become too high. If it is larger than 1.5 $\mu$m, the average particle size becomes too large to obtain a certain desired color of the ceramic color composition. The amount by weight of the first inorganic pigment ranges 5 to 25 wt % of the total of "A" and "B". If it is less than 5 wt %, it is difficult to obtain a certain desired color of the ceramic color composition. If an amount more than 25 wt % is added, a certain desired color of the ceramic inorganic composition can be obtained. However, it is not necessary to add an amount more than 25 wt %.

The second inorganic pigment has an average particle size ranging from 2 to 50 $\mu$m and more preferably from about 3 to about 40 $\mu$m. If it is smaller than 2 $\mu$m, the ceramic color composition becomes insufficient to improve releasability from a bending press mold. If it is larger than 50 $\mu$m, a screen in the screen-printing tends to be clogged and the surface of the ceramic color film becomes rough. The amount by weight of the second inorganic pigment ranges 3 to 15 wt % of the total of "A" and "B". If it is less than 3 wt %, the ceramic color composition becomes insufficient to improve releasability. If it is more than 15 wt %, the ceramic color composition becomes satisfactory in releasability. However, the ceramic color film tends to become porous. Therefore, water or a sealant tend to penetrate into the film and acid resistance of the film becomes inferior.

It is very important feature of the present invention that the above-mentioned specific amounts of the first and second inorganic pigments having the above-mentioned specific average particle diameters are added to the ceramic color composition. It should be noted that releasability of the ceramic color composition from a bending press mold is substantially improved by this feature.

It is preferable that the above-mentioned low melting point glass frit has a melting temperature of from about 530° to about 650° C. and a thermal expansion coefficient of from about $45 \times 10^{-7}$ to about $75 \times 10^{-7}$.

The glass plate is an inorganic glass plate. The glass plate may be a single glass plate, a multiple glass plate or a laminated glass plate. The glass plate may be a curved glass plate or a tempered glass plate.

A ceramic color composition according to the present invention is substantially improved in releasability from a bending press mold, in uniformity of a ceramic color film thickness and in heat resistance and acid resistance, does not affect curvature of a curved glass plate, prevents breakage of the curved glass plate and deterioration of an adhesive, and has a certain desired color.

The present invention will be illustrated with reference to the following nonlimitative examples.

EXAMPLE 1

A ceramic color composition in the form of paste was prepared in accordance with the following steps.

As is shown in Table 1, firstly, 75 wt % of a low melting point glass frit ($PbO$-$B_2O_3$-$SiO_2$) was mixed with 15 wt % of a first inorganic pigment (a mixture of CuO and $Cr_2O_3$) having a black color, an average particle size of about 0.52 $\mu$m and about 3 wt % of a particle size not smaller than 2 $\mu$m and 10 wt % of a second inorganic pigment (CuO) having a black color, and average particle size of about 5.1 $\mu$m and about 80 wt % of a particle size ranging from 2 to 50 $\mu$m so as to prepare a first mixture. Separately, about 3 wt % of ethyl cellulose was mixed with about 4 wt % of acrylic resin and about 93 wt % of pine oil so as to prepare a paste oil. Then, 20 wt % of the paste oil was added to 80 wt % of the first mixture so as to prepare a second mixture. The second mixture was roughly kneaded and then mixed using a roller mill having three rollers for uniform dispersion. Then, the second mixture was diluted with a certain amount of a solvent such as $\alpha$-terpineol or butyl carbitol so as to prepare a ceramic color composition in the form of paste having a certain desired viscosity ranging from about 250 to about 350 P.

The ceramic color composition was applied to a surface of a clear float glass plate having widths of 100 mm and a thickness of about 3.5 mm by the screen-printing. The applied ceramic color composition was dried at a temperature of about 110° C. for about 10 min. Then, the coated glass plate was baked in a furnace at a temperature ranging from about 650° to 710° C. for about 3 min. Then, a bending press mold was pressed against the coated glass plate with a pressure of about 1 kg/cm² for about 30 seconds for bending the coated glass plate. With this, a ceramic color film having a thickness of about 20 $\mu$m was formed on the glass plate.

The ceramic color film did not have defects on its surface. As shown in Table 1, it had a black color. The result of releasability is shown in Table 1. "A" in releasability means that the ceramic color composition did not stick at all to the bending press mold. "B" in releasability means that the ceramic color composition stuck to the bending mold.

With respect to acid resistance, the surface condition of the ceramic color film was checked by the naked eye after immersion of the ceramic color film in a solution of about 0.1N $H_2SO_4$ for about 24 hours at room temperature. The result of acid resistance is shown in Table 1. "A" in acid resistance means that no deterioration of the surface of the ceramic color film was observed.

EXAMPLE 2

The process of Example 1 was repeated except that the second inorganic pigment was replaced by a third inorganic pigment (CuO) having an average particle size of about 3.0 μm and about 68 wt % of a particle size ranging from 2 to 50 μm. With this, a ceramic color film having a thickness of about 20 μm was formed on the glass plate.

COMPARATIVE EXAMPLE 2

The process of Example 1 was repeated except that, as shown in Table 1, the second inorganic pigment was omitted. With this, a ceramic color film having a thickness of about 20 μm was formed on the glass plate.

COMPARATIVE EXAMPLE 3

The process of Example 1 was repeated except that, as shown in Table 1, the second inorganic pigment was omitted and a filler ($Al_2O_3$) was added. With this, a ceramic color film having a thickness of about 21 μm was formed on the glass plate.

TABLE 1

|  | Ex. 1 | Ex. 2 | Ex. 3 | Ex. 4 | Ex. 5 | Ex. 6 | Com. Ex. 1 | Com. Ex. 2 | Com. Ex. 3 |
| --- | --- | --- | --- | --- | --- | --- | --- | --- | --- |
| Mixing Ratio (wt %) | | | | | | | | | |
| Glass frit | 75 | 75 | 85 | 67 | 75 | 75 | 85 | 75 | 75 |
| First pigment | 15 | 15 | 10 | 15 | 10 | 10 | 15 | 25 | 20 |
| Second pigment | 10 | — | 5 | 10 | 10 | 10 | — | — | — |
| Third pigment | — | 10 | — | — | — | — | — | — | — |
| Fourth pigment | — | — | — | 8 | — | — | — | — | — |
| Filler ($Al_2O_3$) | — | — | — | — | 5 | — | — | — | 5 |
| Filler ($ZrO_2$) | — | — | — | — | — | 5 | — | — | — |
| Characteristics | | | | | | | | | |
| Color | Black | Black | Black | Gray | Black | Black | Black | Black | Black |
| Releasability | A | A | A | A | A | A | B | B | B |
| Acid resistance | A | A | A | A | A | A | A | A | A |

EXAMPLE 3

The process of Example 1 was repeated except that the amounts of the glass frit, the first and second inorganic pigments were modified as shown in Table 1. With this, a ceramic color film having a thickness of about 21 μm was formed on the glass plate.

EXAMPLE 4

The process of Example 1 was repeated except that, as shown in Table 1, a part of the glass frit was replaced by a fourth inorganic pigment ($TiO_2$) having a white color, an average particle size of about 0.3 μm and about 1.5 wt % of a particle size not smaller than 2 μm. With this, a ceramic color film having a gray color and a thickness of about 25 μm was formed on the glass plate.

EXAMPLE 5

The process of Example 1 was repeated except that, as shown in Table 1, a part of the first inorganic pigment was replaced by a filler ($Al_2O_3$). With this, a ceramic color film having a thickness of about 20 μm was formed on the glass plate.

EXAMPLE 6

The process of Example 1 was repeated except that, as shown in Table 1, a part of the first inorganic pigment was replaced by a filler ($ZrO_2$). With this, a ceramic color film having a thickness of about 21 μm was formed on the glass plate.

COMPARATIVE EXAMPLE 1

The process of Example 1 was repeated except that, as shown in Table 1, the second inorganic pigment was omitted. With this, a ceramic color film having a thickness of about 20 μm was formed on the glass plate.

What is claimed is:

1. A ceramic color composition having improved releasability without the use of releasing agents, for coating a glass plate with the same, comprising:

first and second inorganic pigments and an optional filler, the total of said first and second inorganic pigments and said optional filler amounting to "A" parts by weight, said first and second inorganic pigments having average particle sizes ranging from 0.1 to 1.5 μm and from 2 to 50 μm, respectively;

a low melting point glass frit amounting to "B" parts by weight;

a resin; and an oil;

wherein a ratio of "A" to the total of "A" and "B" ranges from 0.08 to 0.40, wherein a ratio of the amount by weight of said first inorganic pigment to the total of "A" and "B" ranges from 0.05 to 0.25, and wherein a ratio of the amount by weight of said second inorganic pigment to the total of "A" and "B" ranges from 0.03 to 0.15.

2. A ceramic color composition according to claim 1, wherein said second inorganic pigment is at least one selected from the group consisting of copper oxide, chromium oxide and barium sulfate.

3. A ceramic color composition according to claim 1, wherein the amount of said filler ranges from 0 to about 15 wt % of the total of "A" and "B".

4. A ceramic color composition according to claim 1, wherein said second inorganic pigment has an average particle size ranging from 3 to 40 μm.

5. A ceramic color composition according to claim 1, wherein said low melting point glass frit has a melting temperature of from about 530° to about 650° C. and a thermal expansion coefficient of from about $45 \times 10^{-7}$ to about $75 \times 10^{-7}$.

6. A method of forming a ceramic color film on a glass plate using a ceramic color composition comprising: first and second inorganic pigments, an optional filler, a low melting point glass frit, a resin and an oil, wherein the total of said first and second inorganic pigments and said optional filler amounts to "A" parts by weight, wherein said first and second inorganic pigments have average particle sizes ranging from 0.1 to 1.5 μm and from 2 to 50 μm, respectively, wherein said low melting point glass frit amounts to "B" parts by weight, wherein a ratio of "A" to the total of "A" and "B" ranges from 0.08 to 0.40, wherein a ratio of the amount by weight of said first inorganic pigment to the total of "A" and "B" ranges from 0.05 to 0.25, and wherein a ratio of the amount by weight of said second inorganic pigment to the total of "A" and "B" ranges from 0.03 to 0.15, the method comprising the steps of:

(a) applying the ceramic color composition to the glass plate;
(b) drying the ceramic color composition;
(c) baking the ceramic color composition so as to form the ceramic color film on the glass plate; and
(d) bending the glass plate and the ceramic color film by a bending press mold wherein the ceramic film on the bent glass plate shows improved releasability without the use of releasing agents.

* * * * *